United States Patent [19]

Fiocca

[11] Patent Number: 5,732,391
[45] Date of Patent: Mar. 24, 1998

[54] METHOD AND APPARATUS OF REDUCING PROCESSING STEPS IN AN AUDIO COMPRESSION SYSTEM USING PSYCHOACOUSTIC PARAMETERS

[75] Inventor: James Leonard Fiocca, Palatine, Ill.

[73] Assignee: Motorola, Inc., Schaumburg, Ill.

[21] Appl. No.: 717,613

[22] Filed: Sep. 20, 1996

Related U.S. Application Data

[63] Continuation of Ser. No. 208,415, Mar. 9, 1994, abandoned.

[51] Int. Cl.$^6$ ........................................ G10L 3/02
[52] U.S. Cl. ........................ 704/229; 704/230; 704/201
[58] Field of Search ............................ 395/2.38, 2.1, 395/2.39

[56] References Cited

U.S. PATENT DOCUMENTS

| | | | |
|---|---|---|---|
| 4,956,871 | 9/1990 | Swaminathan | 381/31 |
| 5,222,189 | 6/1993 | Fielder | 395/2 |
| 5,285,498 | 2/1994 | Johnston | 381/2 |
| 5,375,189 | 12/1994 | Tsutsui | 395/2.38 |

OTHER PUBLICATIONS

Teh, D.H. et al. *Subband Coding of High Fidelity Quality Audio Signals at 128K bps*, Sep., 1992, ICASSP-92, pp. II 97 to 200.

Veldhuis, R.N.H. et al, *Subband Coding of Digital Audio Signals Without Loss of Quality*, Feb., 1989, IEEE, pp. 2009-2012.

Veldhuis, R.N.J., Bit Rates in Audio Source Coding, Jan. 1992 IEEE Journal Select Areas of Comm; vol. 10, No. 1, pp. 86-96.

International Standards Organization International Committee (ISO/IEC) 11172-3 Draft International Standard, "Coding of Moving Pictures and Associated Audio for Digital Storage Media at Up To 1.5 Mbits/s", Nov. 24, 1992, pp. 2, C-5 -C-12, B-2 -B-5, B9.

*Primary Examiner*—Allen R. MacDonald
*Assistant Examiner*—Alphonso A. Collins
*Attorney, Agent, or Firm*—Darleen J. Stockley

[57] ABSTRACT

Complexity of an audio compression system is reduced by initially allocating some bits to frequency subbands. The initial bit allocation is based on historical signal-to-mask ratio information for the audio compression system. The remaining bits are allocated to frequency subbands based on psychoacoustic parameters of the audio being encoded.

7 Claims, 1 Drawing Sheet

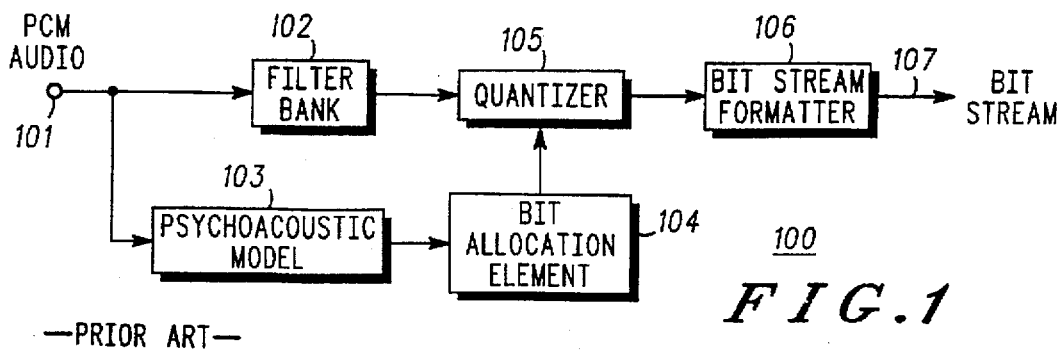
FIG.1
—PRIOR ART—
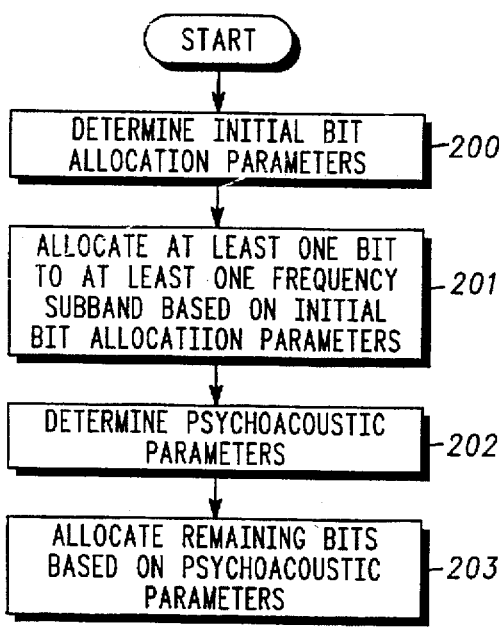
FIG.2
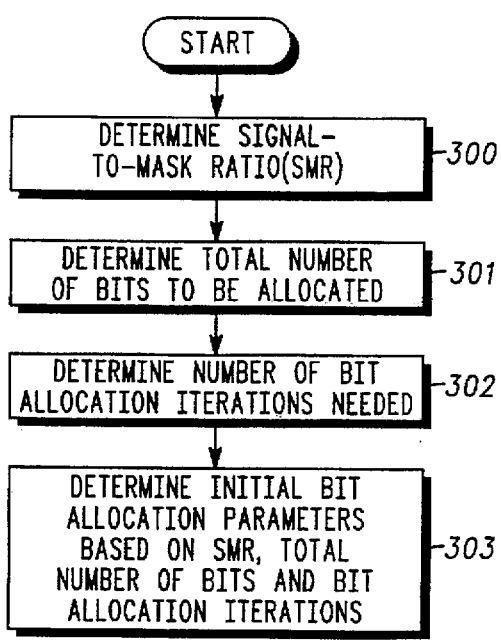
FIG.3
FIG.4
| 400 INITIAL BIT ALLOCATION | FREQ. SUBBAND | 1 | 2 | 3 | ... | N-3 | N-2 | N-1 | N |
|---|---|---|---|---|---|---|---|---|---|
| | BITS ALLOCATED | 9 | 8 | 6 | | 3 | 2 | 0 | 0 |
| 401 FINAL AUDIO BIT ALLOCATION | FREQ. SUBBAND | 1 | 2 | 3 | ... | N-3 | N-2 | N-1 | N |
|---|---|---|---|---|---|---|---|---|---|
| | BITS ALLOCATED | 11 | 10 | 7 | | 3 | 2 | 0 | 0 |

METHOD AND APPARATUS OF REDUCING PROCESSING STEPS IN AN AUDIO COMPRESSION SYSTEM USING PSYCHOACOUSTIC PARAMETERS

This is a continuation of application Ser. No. 08/208,415, filed Mar. 9, 1994 and now abandoned.

FIELD OF THE INVENTION

The invention relates generally to the field of audio compression, and in particular, to a reduction of processing steps in an audio compression system.

BACKGROUND OF THE INVENTION

Communication systems are known to include a plurality of communication devices and communication channels, which provide the communication medium for the communication devices. To increase the efficiency of the communication system, audio that needs to be communicated is digitally compressed. The digital compression reduces the number of bits needed to represent the audio while maintaining perceptual quality of the audio. The reduction in bits allows more efficient use of channel bandwidth and reduces storage requirements. To achieve digital audio compression, each communication device, may include an encoder and a decoder. The encoder allows a communication device to compress audio before transmission over a communication channel. The decoder enables the communication device to receive compressed audio from a communication channel and render it audible. Communication devices that may use digital audio compression include high definition television transmitters and receivers, cable television transmitters and receivers, portable radios, and cellular telephones.

One type of audio encoder has a fixed target bit rate for the compressed audio information. The target bit rate is fixed by the desired storage media, the desired communication channel, and/or the desired level of audio quality at the decoder. Since the target bit rate is fixed, the number of bits available to an audio frame is also fixed. Another type of audio encoder is a subband encoder. Subband encoders divide the frequency spectrum of the signal to be encoded into several distinct subbands. The magnitude of the signal in a particular subband may be used in compressing the signal.

An exemplary prior art fixed bit rate sub-band audio encoder is the International Standards Organization International Electrotechnical Committee (ISO/IEC) 11172-3 international standard, hereinafter referred to as MPEG (Moving picture Experts Group) audio MPEG audio initially assigns zero bits to each subband, i.e., starts with zero magnitude in each subband. Then each available bit is iteratively allocated to the subband with the lowest mask-to-noise ratio (MNR), where the MNR is the signal-to-noise ratio (SNR) minus the signal-to-mask ratio (SMR). The process is iterated until all the bits available are allocated. For a given sampling rate, the number of iterations required to allocate all the available bits is proportional to the bit rate. This presents a problem for high bit rates, where hundreds of iterations are required to allocate all the available bits. For example, an MPEG audio encoder with a bit rate of 384 kilobits per second may require 265 iterations for a complete bit allocation. In contrast, an MPEG audio encoder with a bit rate of 64 kilobits per second may require only 25 iterations for a complete bit allocation. If the compression is to be done in real time, i.e., at the rate the audio is being produced, then for higher bit rates, each iteration requires faster or more complex processing power.

Therefore, a need exists for a method and apparatus that reduces the number of iterations required to allocate bits in a fixed-bit rate subband audio encoder. A need also exists for a method and apparatus that stabilizes the number of iterations required regardless of the bit rate.

BRIEF DESCRIPTION OF THE DRAWINGS

FIG. 1 illustrates an audio compression system employing a bit allocation element in accordance with the present invention.

FIG. 2 is a flow diagram of a method for allocating bits in an audio compression system in accordance with the present invention.

FIG. 3 is a flow diagram of a method for determining initial bit allocation in accordance with the present invention.

FIG. 4 is an illustration of exemplary bit allocations made in accordance with the present invention.

DESCRIPTION OF A PREFERRED EMBODIMENT

Generally, the present invention provides a method and apparatus that reduces the processing steps required in an audio compression system. This is accomplished by initially allocating some of the available bits to frequency subbands without regard to the exact characteristics of the audio being encoded. This initial allocation is based on some previous audio samples that may represent a wide range of audio or a selected type of audio that is similar to the audio being encoded. In addition, the initial allocation is chosen such that the number of iterations required in real time to allocate the remaining bits is approximately constant regardless of the compression ratio. After the initial allocation, the remaining bits are iteratively allocated in real time to frequency subbands based on the psychoacoustic characteristics of the audio being encoded. With the present invention, the total number of processing steps for compressing audio is reduced and the amount of processing required in real time is normalized over many compression ratios.

The present invention is more fully described with reference to FIGS. 1–4. FIG. 1 illustrates an audio compression system 100 that receives an audio frame, such as a frame of pulse code modulated (PCM) audio 101. The frame of PCM audio 101 is analyzed by a filterbank 102 and a psychoacoustic model 103. The filterbank 102 outputs a frequency domain representation of the frame of audio for several frequency subbands. The psychoacoustic model 103 determines in conjunction with the bit allocation element 104, the number of bits that should be allocated to each frequency subband based on the perception of the human ear. Each bit is iteratively allocated and the psychoacoustic parameters are re-analyzed after each iteration. The final bit allocation is output to the quantizer 105 by the bit allocation element 104. The quantizer 105 compresses the output of the filterbank 102 to correspond to the final bit allocation. The bit stream formatter 106 takes the compressed audio from the quantizer 105 and adds any header or additional information and formats it into a bit stream 107. The co-pending application, A Bit Allocation Method That Improves Audio Quality Perception, U.S. Ser. No. 08/207,995, filed Mar. 9, 1994, describes a bit allocation method that improves perceived audio quality.

The PCM audio 101 is typically a linearly quantized representation of an audio signal. The sample size varies depending on the requirements of the application, typically in the range of 8–24 bits. Compact disc and digital audio tape use 16 bits. The sampling frequency also varies, typically in the range 8–48 kHz. Compact disc uses 44.1 kHz. In addition, multiple channels may be interleaved in the PCM audio signal. Compact disc and digital audio tape use 2 channels. So for an example compact disc-based audio compression system, the input PCM audio is 16 bits per sample, 44.1 kHz sampling frequency, and 2 channels. This yields a reference input bit rate of about 1.5 megabits per second.

The filterbank 102, which may be implemented in accordance with MPEG audio by a digital signal processor such as the MOTOROLA DSP56002, transforms the input time domain audio samples into a frequency domain representation. The filterbank 102 uses a small number (2–32) of linear frequency divisions of the original audio spectrum to represent the audio signal. The filterbank 102 outputs the same number of samples that were input and is therefore said to critically sample the signal. The filterbank 102 critically samples and outputs N subband samples for every N input time domain samples.

The psychoacoustic model 103, which may be implemented in accordance with MPEG audio by a digital signal processor such as the MOTOROLA DSP56002, analyzes the signal strength and masking level in each of the frequency subbands. It outputs a signal-to-mask ratio (SMR) value for each subband. The SMR value represents the relative sensitivity of the human ear to that subband for the given analysis period. The higher the SMR, the more sensitive the human ear is to noise in that subband, and consequently, more bits should be allocated to it. Compression is achieved by allocating fewer bits to the subbands with the lower SMR, to which the human ear is less sensitive.

The bit allocation element 104, which may be implemented by a digital signal processor such as the MOTOROLA DSP56002, uses the SMR information from the psychoacoustic model 103, the desired compression ratio, and other bit allocation parameters to generate a complete table of bit allocation per subband. In contrast to the prior art that started with an initial bit allocation table of zero bits per subband, the present invention provides an initial bit allocation table with some of the available bits assigned to subbands. The initial bit allocation process is discussed below with reference to FIG. 3. The bit allocation element 104 iteratively allocates the bits remaining to produce a final bit allocation table that assigns all the available bits to frequency subbands using the SMR information from the psychoacoustic model 103.

The quantizer 105, which may be implemented in accordance with MPEG audio by a digital signal processor such as the MOTOROLA DSP56002, uses the bit allocation information to scale and quantize the subband samples to the specified number of bits. Various types of scaling may be used prior to quantization to minimize the information lost by quantization. The final quantization is typically achieved by processing the scaled subband sample through a linear quantization equation, and then truncating the [m–n] least significant bits from the result, where m is the initial number of bits, and n is the number of bits allocated for that subband.

The bit stream formatter 106, which may be implemented in accordance with MPEG audio by a digital signal processor such as the MOTOROLA DSP56002, takes the quantized subband samples from the quantizer 105 and packs them onto the bit stream 107 along with header information, bit allocation information, scale factor information, and any other side information the coder requires. The bit stream is output at a rate equal to the PCM audio 101 input bit rate divided by the audio compression ratio.

The present invention reduces the number of iterations of the bit allocation element 104 by using the flow chart shown in FIG. 2. In step 200, initial bit allocation parameters are determined. In step 201, at least one bit is allocated to a frequency subband based on the initial bit allocation parameters. Then the psychoacoustic parameters of the audio being encoded are determined in step 202. Any bits that were not allocated in step 201 are iteratively allocated in step 203 based upon the psychoacoustic parameters.

Determining the initial bit allocation parameters in step 200 may be accomplished empirically—based on prior knowledge of general audio signals and how they generally behave. Step 200 may also be determined dynamically, periodically determining the initial bit allocation parameters based on a previous audio frame, or a combination of previous audio frames. A combination of the empirical and dynamic approaches may also be used. In any case, knowledge of the desired compression ratio is used to determine approximately how many total bits are to be allocated, and consequently, how many bits to allocate initially. After determining the initial bit allocation parameters, the bits are allocated to frequency subbands in step 201. Rather than initially assigning zero bits to each subband as in the prior art, the initial bit allocations are assigned to each subband.

In step 202, the psychoacoustic parameters are determined. MPEG audio gives an example called psychoacoustic model 1, in annex D. There are two general principles of perceptual audio coding that are the basis for the psychoacoustic model: 1) the sensitivity of the human ear to quantization noise in a given subband is directly proportional to the level of audio energy in that subband, and 2) the sensitivity of the human ear to quantization noise in a given subband is inversely proportional to the masking level in that subband. The output of the psychoacoustic model is the signal-to-mask ratio, which accounts for both of these phenomena. The calculation of the signal level is done as a direct result of the initial frequency domain transformation. The masking level calculation is, however, much more complex. The underlying principle is that audio energy in one subband becomes far less important to the human ear if there is audio energy in adjacent subbands. The masking level calculation therefore measures the extent that each subband is masked by energy in the other subbands. The entire psychoacoustic model is re-calculated each audio frame to account for the time-varying properties of the audio signal.

In step 203, the bits that were not allocated in step 201 are allocated. The SMR values calculated in step 202 remain constant for the duration of the bit allocation iterations. The iteration to completion proceeds as follows:

1) Calculate the signal-to-noise ratio (SNR) for each subband. The SNR for a given subband is approximately equal to 6 times the number of bits allocated to it so far.
2) Calculate the mask-to-noise ratio (MNR) for each subband (sb). MNR(sb)=SNR(sb)–SMR(sb).
3) Determine the subband that has the lowest MNR.
4) Increment the bit allocation for that subband.
5) Calculate the total number of bits allocated so far and compare it to the total number allowed for the subband samples.
6) Are there bits available for another iteration? If yes, iterate again (go to 1). If no, bit allocation is complete.

FIG. 3 is a preferred flow diagram for determining the initial bit allocation parameters, i.e., step 200 in FIG. 2. This is the empirical method mentioned earlier. An off-line analysis is done to determine some average or representative characteristics about the types of audio signals that will be coded. The analysis may be accomplished using an audio encoder that uses an initial bit allocation of zero bits per subband. Several representative samples of audio signals are run through the encoder for analysis. In step 300, the SMR is averaged over all the trials for each subband. This averaged SMR is assumed to be representative of most of the audio signals to be coded. The SMR's to be averaged could be calculated using psychoacoustic model 1 from ISO/IEC 11172-3 annex D, for example.

In step 301, the total number of bits to be allocated is calculated for every possible bit rate that the coder must support. For each bit rate, the total number of bits to be allocated during an audio frame is equal to the bit rate times the duration of the audio frame. From this, the estimated number of bits required for the header information, the bit allocation information, the scale factor information, and whatever other side information the coder must transmit is subtracted from the total. The remainder is the total number of bits allowed for just the subband samples.

In step 302, the number of bit allocation iterations needed to completely fill the bit allocation for each of the bit rates of step 301 is calculated. This may be done by observing the bit allocation element with no initialization, and counting the number of iterations for each allowable bit rate. Since some of the side information can vary in size, there may be some variation in the number of iterations required to fill the bit allocation from one frame to another. In this case, the average number is used. An alternative method is to divide the total bits allowed for subband samples as calculated in step 301 by the number of sets of subband samples coded into each audio frame to determine the number of iterations required to completely fill the bit allocation. This latter method assumes that the bit allocation is always incremented in steps of 1 bit per subband, which is not, in general, true for all subband audio coders. Therefore, the former method is preferred.

Once the total number of iterations is known, the next step 303 is to determine the optimal initial bit allocation. The basic principle underlying choosing an optimal initial bit allocation is that the averaged SMR determined in step 300 rather than the true SMR, if used only up to a certain point, will drive the bit allocation to an initially sound but incomplete state, and then the final iterations based on the true SMR will fine tune the bit allocation according to the dynamically varying psychoacoustic properties of the real audio signals. The number of iterations that need to be done in real time (step 203) in order to sufficiently adapt the bit allocation to the true audio signals is determined empirically. A preferred number of real time iterations based upon subjective listening tests is at least 30. Since the MPEG audio implementation on which the experiments were conducted has a variance of about +/−15 iterations per frame, an average of 45 is used as the reference, resulting in a range of 30–60 iterations performed in real time each frame. The optimal number of iterations for generating the initial bit allocation is then calculated by subtracting approximately 45 from the total number of iterations required to completely fill the bit allocation. The initial bit allocation is then generated by running the bit allocation element (initialized to 0 bits per subband) off-line for the optimal amount of iterations, using the averaged SMR, and storing the resulting bit allocation in a table for access by the real time implementation in step 201. This procedure is repeated for every allowable bit rate that the coder must support.

FIG. 4 illustrates an example of an initial bit allocation 400 and a final audio frame bit allocation 401. Note that the initial bit allocation is a subset of the final bit allocation, and is much closer to the final bit allocation than it is to all 0's. A few of the subbands did not receive any additional bits during the final 30–60 iterations, because the averaged SMR used in generating the initial bit allocation just happened to closely match the true SMR in this case. For other subbands, the true SMR demanded more bits for some subbands than did the averaged SMR, and so the final bit allocation shows more bits for those subbands.

The present invention reduces the number of processing steps in an audio compression system. For example, an MPEG audio encoder at 384 kilobits per second may require 265 iterations to generate a complete bit allocation from scratch. With the present invention, the same bit allocation can be generated in real time with only about 45 iterations, a savings of about 85% in processing steps, with no perceptible loss of audio quality. The savings in processing steps with the invention is in general, proportional to the desired bit rate of the subband audio coder, i.e., the higher the bit rate, the greater the savings in processing steps. In addition, since the approximately 45 iterations needed by the present invention is constant regardless of the output bit rate, the processing complexity is normalized for all bit rates.

I claim:

1. A method for reducing processing steps in an audio compression system, the method comprising the steps of:
    a) determining initial bit allocation parameters for frequency subbands of an audio frame, based on a selected audio compression ratio, wherein step (a) further comprises:
        determining the initial bit allocation parameters for the frequency subbands of a plurality of audio frames;
        for every N frames, wherein N is any integer greater than or equal to 1, determining the initial bit allocation parameters, and includes the steps of
            a1) computing an average signal-to-mask ratio for the frequency subbands based on at least one signal-to-mask ratio of a previous audio frame;
            a2) determining the bit set, wherein the size of the bit set is determined based on the selected audio compression ratio;
            a3) determining a total number of bit allocation iterations required to allocate all bits of the bit set; and
            a4) determining the initial bit allocation parameters based on the average signal-to-mask ratio and the total number of bit allocation iterations required, such that a predetermined number of bit allocation iterations are required to allocate the bit set;
    b) for the audio frame, allocating at least one bit of a bit set to at least one frequency subband of the frequency subbands based on the initial bit allocation parameters;
    c) determining psychoacoustic parameters, signal-to mask ratios, for each subband of audio for the audio frame;
    d) allocating remaining bits of the bit set to at least some of the frequency subbands based on the psychoacoustic parameters.

2. In the method of claim 1, step (a4) further comprises selecting the predetermined number of bit allocation iterations within a range of 30 to 60 iterations.

3. In the method of claim 1, step (c) further comprises determining a signal-to-mask ratio as at least part of the psychoacoustic parameters.

4. In the method of claim 1, step (d) further comprises allocating the remaining bits to at least some of the frequency subbands of the bit set based upon the relationship of a signal-to-noise ratio to a signal-to-mask ratio wherein the mask-to-noise ratio, MNR, is the ratio of the signal-to-noise ratio, SNR, to the signal to mask ratio, SMR, and where the MNR is computed in the log domain, the MNR ratio is transformed into a difference.

5. The method of claim 1 further comprising the step of:

e) for a subsequent audio frame of the plurality of audio frames, initializing the bit allocation parameters to the initial bit allocation parameters.

6. The method of claim 1 further comprising the step of:

e) for a subsequent audio frame of the plurality of audio frames, initializing the bit allocation parameters to zero.

7. An audio compression system that includes:

a filterbank that receives an audio frame;

a psychoacoustic model that receives the audio frame, wherein the psychoacoustic model determines psychoacoustic parameters, signal-to-mask ratios, for each subband of the audio frame;

a quantizer that is operably coupled to the filterbank, wherein the quantizer compresses the audio frame based on bit allocation information; and a bit allocation element that is operably coupled to the psychoacoustic model, wherein the bit allocation element provides the bit allocation information to the quantizer, and wherein the bit allocation information is based on an intitial bit allocation of at least one bit of a bit set allocated to at least one frequency subband of a set of frequency subbands of the audio frame, for every N frames, wherein N is any integer greater than or equal to 1, determines the initial bit allocation parameters and allocates remaining bits of the bit set to at least some frequency subbands of the set of frequency subbands based on the psychoacoustic parameters, signal-to-mask ratios, for each subband of the audio frame, wherein determining the initial bit allocation parameters includes:

a1) computing an average signal-to-mask ratio for the frequency subbands based on at least one signal-to-mask ratio of a previous audio frame;

a2) determining the bit set, wherein the size of the bit set is determined based on the selected audio compression ratio;

a3) determining a total number of bit allocation iterations required to allocate all bits of the bit set; and a4) determining the initial bit allocation parameters based on the average signal-to-mask ratio and the total number of bit allocation iterations required, such that a predetermined number of bit allocation iterations are required to allocate the bit set.

* * * * *